(12) United States Patent
Sakai et al.

(10) Patent No.: US 6,594,571 B2
(45) Date of Patent: Jul. 15, 2003

(54) OCCUPANT DETERMINING DEVICE FOR A VEHICLE SEAT

(75) Inventors: Morio Sakai, Toyota (JP); Yasushi Saitoh, Anjo (JP); Koji Aoki, Nagoya (JP); Masaki Mori, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/253,417

(22) Filed: Sep. 25, 2002

(65) Prior Publication Data
US 2003/0074121 A1 Apr. 17, 2003

(51) Int. Cl.[7] ............................................. G06F 17/00
(52) U.S. Cl. ................................. 701/45; 280/735
(58) Field of Search ............................. 701/35, 45, 46, 701/47; 280/735, 734, 801.1; 307/10.1

(56) References Cited

FOREIGN PATENT DOCUMENTS

JP        2000-127890 A        5/2000

Primary Examiner—Richard M. Camby
(74) Attorney, Agent, or Firm—Burns, Doane, Swecker & Mathis, LLP

(57) ABSTRACT

An occupant determining device for a vehicle seat includes a tension detecting means for detecting a tension of a seat belt, a load detecting means for detecting a load applied to the vehicle seat, a determining means for determining an occupant on the vehicle seat and a tightened state of the seat belt based on either one or both of a detected result of the tension detecting means and the load detecting means, and a display means for displaying a determination result of the tightened state of the seat belt.

18 Claims, 3 Drawing Sheets

OCCUPANT DETERMINING DEVICE FOR A VEHICLE SEAT

This application is based on and claims priority under 35 U.S.C. §119 with respect to Japanese Application No. 2001-292473 filed on Sep. 25, 2001, the entire content of which is incorporated herein by reference.

1. Field of the Invention

This invention generally relates to an occupant determining device for a vehicle seat. More particularly, the present invention pertains to an occupant determining device for a vehicle seat operated based on a tension of a seat belt for determining whether an occupant on the vehicle seat is an adult or a child.

2. Background of the Invention

In case where an occupant sitting on a passenger seat of a vehicle is a child or a child seat is fixed to a seat, an airbag for the passenger seat is prohibited to be deployed according to regulations in the United States. Thus, an occupant determining device for a vehicle seat which can determine whether an occupant sitting on the passenger seat is an adult or the child, or whether the child seat is on the seat has been developed. However, when an occupant on the seat is determined based on a load applied to the seat, it is difficult to distinguish whether the load is due to a total of a weight of the child seat and a load for tightening a seat belt to fix the child seat to the seat, a total weight of the child and the child seat, or an adult seated. Japanese Laid-open Patent Publication No. 2000-127890 discloses a known device for determining an occupant on the seat based on a tension of the seat belt and the load applied to the seat. In this disclosed device, when the tension of the seat belt exceeds a threshold value, it is determined that the child seat is fixed to the seat. When the tension does not exceed the threshold value, it is further determined whether the occupant is an adult or a child based on a detected value of a load sensor. That is, it is determined that the occupant is an adult if the detected value exceeds a threshold value. If the detected value does not exceed the threshold value, it is determined that the occupant is a child.

According to the disclosed device, the tension of the seat belt is used as criteria for determining whether or not the child seat is fixed to the seat. Thus, the seat belt requires to be securely fastened for fixing the child seat to the seat. In addition, a person requires to make sure that the seat belt is securely fastened.

Thus, a need exists for the occupant determining device for the vehicle seat which allows a person fixing the child seat to the seat to make sure by himself/herself that the seat belt is securely fastened.

SUMMARY OF THE INVENTION

According to an aspect of the present invention, an occupant determining device for a vehicle seat includes a tension detecting means for detecting a tension of a seat belt, a load detecting means for detecting a load applied to the vehicle seat, a determining means for determining an occupant on the vehicle seat and a tightened state of the seat belt based on either one or both of a detected result of the tension detecting means and the load detecting means, and a display means for displaying a determination result of the tightened state of the seat belt.

According to another aspect of the present invention, when a detected value of the tension detecting means is equal to or greater than a first threshold value, the determining means determines that the occupant on the vehicle seat is in a first state and the seat belt is in a first tightened state. On the other hand, when the detected value of the tension detecting means is less than the first threshold value, the determining means determines that the seat belt is in a second tightened state. In addition, when the determining means determines that the seat belt is in the second tightened state and a detected value of the load detecting means is equal to or greater than a second threshold value, the determining means determines that the occupant on the vehicle seat is in a second state. Further, when the determining means determines that the seat belt is in the second tightened state and the detected value of the load detecting means is less than the second threshold value, the determining means determines that the occupant on the vehicle seat is in the first state.

According to further another aspect of the present invention, the first state includes the state that a child, a child restraint system or no occupant is on the vehicle seat. In addition, the second state includes the state that an adult is on the vehicle seat.

According to still further another aspect of the present invention, the occupant determining device for the vehicle seat comprises a tension detecting means for detecting a tension of a seat belt, a determining means for determining a tightened state of the seat belt based on a detected result of the tension detecting means, and a display means for displaying a determination result of the tightened state of the seat belt.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
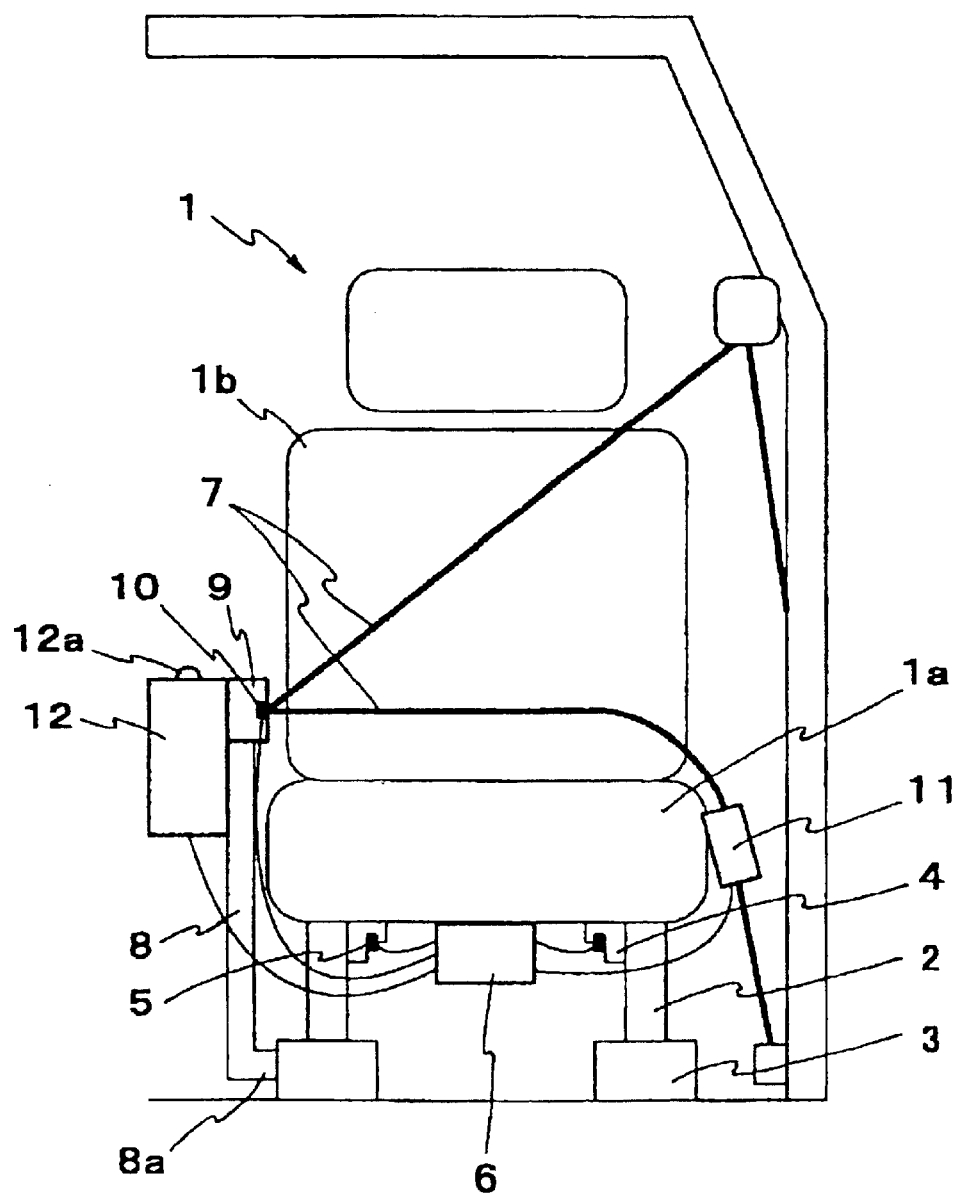
FIG. 1 is a view showing a structure of an occupant determining device for a vehicle seat according to an embodiment of the present invention.

A structure of an embodiment of the present invention will be explained referring to FIG. 1. A vehicle seat 1 is provided on a passenger seat side of a vehicle. Right and left lower arms 2 supporting a seat cushion 1a and a seat back 1b are provided on right and left upper rails 3 respectively which are secured on a vehicle floor so as to be slidably moved in the vehicle longitudinal direction. Brackets 4 consist of two pairs of brackets provided on right and left front sides (front in FIG. 1) and right and left rear sides (behind in FIG. 1) respectively of the seat cushion 1a for securing the seat cushion 1a to the lower arms 2. The brackets 4 are provided with load sensors 5 (load detecting means) respectively and electrically connected to a controller 6 provided on an undersurface of the seat cushion 1a. The load sensors 5 are configured by a load sensor 5a provided at the front left side bracket 4, a load sensor 5b provided at the front right side bracket 4, a load sensor 5c provided at the rear right side bracket 4, and a load sensor 5*d* provided at the rear left side bracket 4. Each load sensor 5 includes an element for detecting deformation such as a strain gauge for detecting the strain of each bracket 4 caused by the load applied to the seat cushion 1*a* and transmits a detected result, i.e., a voltage signal to the controller 6.

An anchor bracket 8*a* provided at a lower end of a belt anchor 8 to which a seat belt 7 is connected is connected to the left side upper rail 3 in FIG. 1. A seat belt buckle 9 is attached to an upper end of the belt anchor 8. In addition, the seat belt buckle 9 is provided with a seat belt buckle switch 10. When a tongue plate (not shown) provided at the seat belt 7 is inserted into the seat belt buckle 9 to be latched, the seat belt buckle switch 10 is set to be ON. The detected result of the seat belt buckle switch 10, i.e., the voltage signal, is input to the controller 6 so that the controller 6 can detect whether the seat belt 7 is fastened or not.

The seat belt 7 is fixed to the vehicle floor on the right side of the seat cushion 1*a* as shown in FIG. 1. A belt tension switch 11 (tension detecting means) is provided close to a portion where the seat belt 7 is fixed to the vehicle floor. The belt tension switch 11 is configured by a spring switch. When a predetermined tension (first threshold value) or more tension is applied to the seat belt 7, the belt tension switch 11 is set to be ON. The belt tension switch 11 being electrically connected to the controller 6 sends the detected result, i.e., the voltage signal to the controller 6. Then, the tension of the seat belt 7 can be detected by the controller 6.

At an upper end of the belt anchor 8, an indicator 12 (display means) is provided. Firstly, a child seat (not shown) is set on the seat cushion 1*a* and fixed thereto by tightening with the seat belt 7. Then, when the tightening tension of the seat belt 7 is appropriate for fixing the child seat to the seat, a lamp 12*a* of the indicator 12 is switched on. A person who has fixed the child seat to the seat can make sure that the seat belt 7 is appropriately tightened by lightening of the lamp 12*a*.

Figure 2:
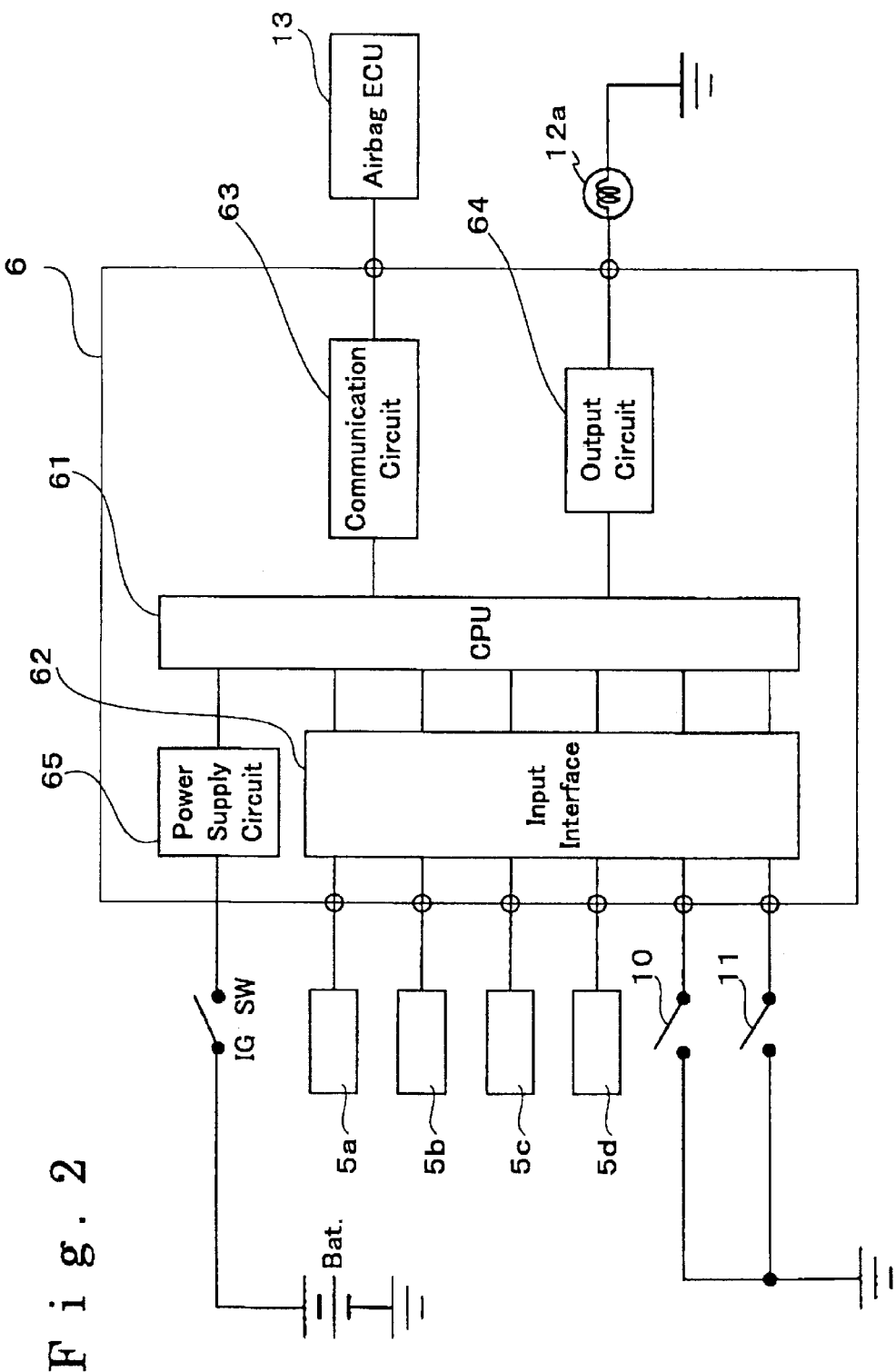
FIG. 2 is a diagram showing a controller of the occupant determining device for the vehicle seat according to the embodiment of the present invention.

FIG. 2 is a diagram showing a main structure of the controller 6. The controller 6 includes a CPU 61 (determining means) as a central processing unit, an input interface 62, a communication circuit 63 and an output circuit 64. The input interface 62 includes an amplifier for amplifying the voltage signal and a filter for stabilizing the voltage signal. The voltage signals detected by the load sensors 5*a*, 5*b*, 5*c*, and 5*d* are converted into appropriate voltage signals through the input interface 62 and inputted to the CPU 61. The voltage signals sent from the seat belt buckle switch 10 and the belt tension switch 11 are also inputted to the CPU 61 through the input interface 62. The controller 6 also includes a power supply circuit 65 to which an electric power is supplied from a battery of the vehicle when an ignition is switched on for supplying the electric power to the CPU 61 and the input interface 62.

An output side of the CPU 61 is connected to an airbag ECU 13 through the communication circuit 63. An output signal as a calculated result of the CPU 61 is transmitted to the airbag ECU 13. In addition, the output side of the CPU 61 is connected to the lamp 12*a* of the indicator 12 through the output circuit 64. The lamp 12*a* is switched on according to the output signal of the CPU 61.

An operation of the occupant determining device for the vehicle seat according to the embodiment of the prevent invention will be explained as follows referring to a flow chart shown in FIG. 3.

Figure 3:
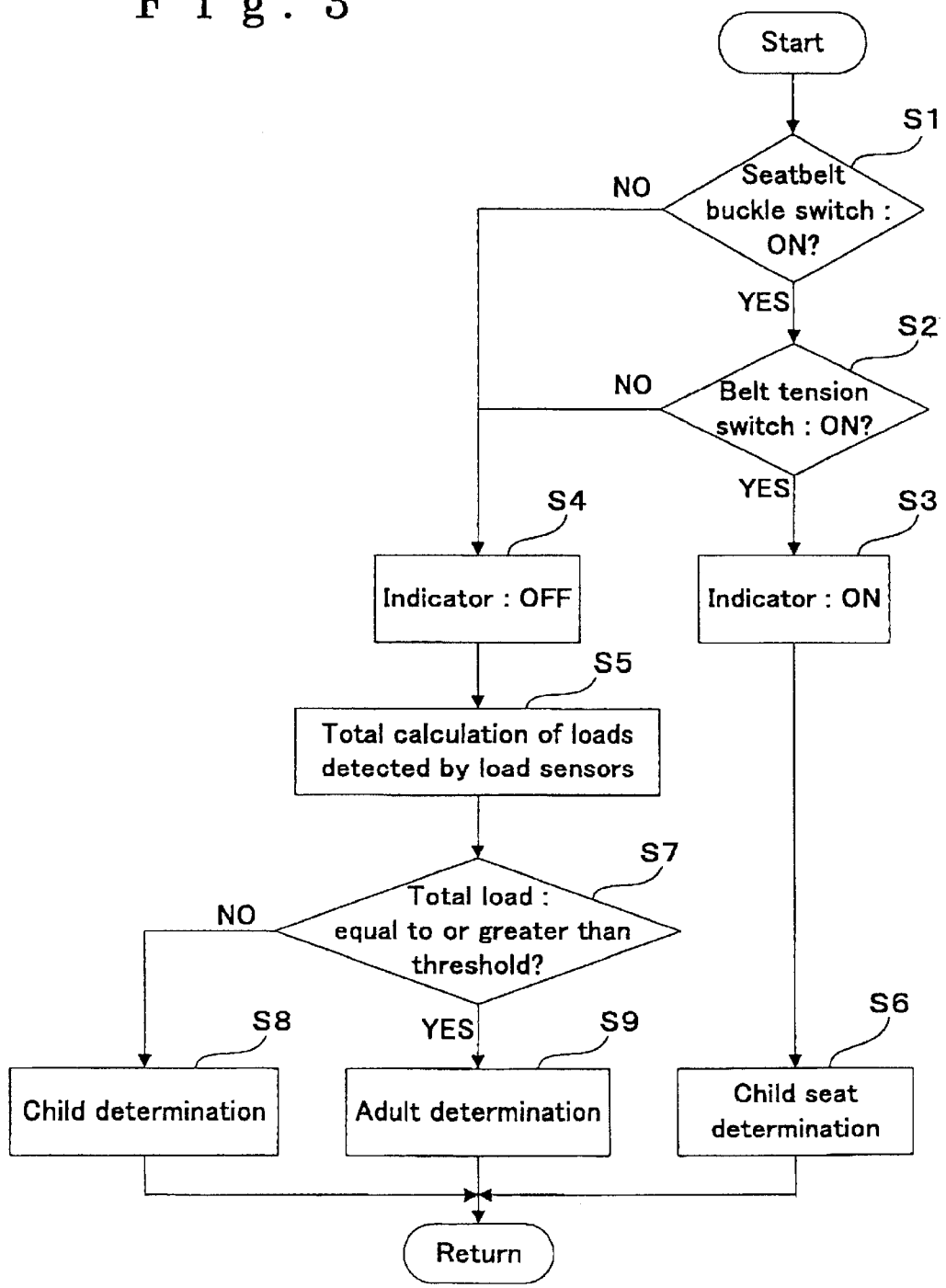
FIG. 3 is a flowchart showing a determining operation performed by a central processing unit in the controller of the occupant determining device for the vehicle seat according to the embodiment of the present invention.

Under the condition that the ignition of the vehicle is ON, the CPU 61 in the controller 6 transacts the routine shown in FIG. 3 at predetermined intervals.

When the seat belt 7 is fastened by inserting the tongue plate of the seat belt 7 into the seat belt buckle 9, the seat belt buckle switch 10 is set to be ON. Whereas, if an adult or a child is seated on the seat without the seat belt fastened or no occupant is seated on the seat, i.e., the seat belt 7 is not fastened, the seat belt buckle switch 10 is set to be OFF.

At step S1 in FIG. 3, it is determined whether the seat belt buckle switch 10 is ON or OFF. When ON state of the seat belt buckle switch 10 is recognized in the CPU 61, the operation proceeds to step S2. On the contrary, when the seat belt buckle switch 10 is in OFF state, the operation proceeds to step S4.

When the child seat is fixed to the seat cushion 1*a* (first state), the seat belt 7 is normally tightened with a higher tension than the case when an adult or a child is seated on the seat. The seat belt 7 is tightened with the predetermined tension or more (first tightened state) so that the belt tension switch 11 sends the voltage signal representing the ON state to the CPU 61. At this time, at step S2, the CPU 61 determines that the belt tension switch 11 is in ON state so that the operation proceeds to step S3. At step S3, the CPU 61 transmits the output signal to the output circuit 64 to turn on the lamp 12*a* (shown in FIGS. 1,2) of the indicator 12 (shown in FIG. 1). Then, the lamp 12 is turned on as a result.

Whereas, when an adult or a child is seated with the seat belt 7 fastened, the seat belt 7 is in the tightened state with less than the predetermined tension (second tightened state). At this time, the belt tension switch 11 is in OFF state. Thus, a negative judgment (NO) is obtained at step 2 in FIG. 3 and the operation proceeds to step 5.

At step 3, the lamp 12*a* of the indicator 12 is turned on and then the operation proceeds to step S6. At this time, the child seat is fixed to the seat 1. That is, the seat 1 is in the state that the airbag should not be deployed (first state). Accordingly, at step S6, the CPU 61 sends the output signal for not deploying the airbag to the airbag ECU 13 through the communication circuit 63.

When the operation proceeds to step S5 from step S4 at which the lamp 12*a* of the indicator 12 is not turned on, the CPU 61 calculates the load applied to the seat cushion 1*a* at step S5. In the embodiment of the prevent invention, the load sensors 5*a*, 5*b* shown in FIGS. 1, 2 detect the load added to a front portion of the seat cushion 1*a* and the load sensors 5*c*, 5*d* shown in FIGS. 1, 2 detect the load added to a rear portion of the seat cushion 1*a*. The CPU 61 calculates a total load by adding loads applied to the front portion and the rear portion of the seat cushion 1*a* and detected as stated above.

The CPU stores a predetermined load value (second threshold value) in an internal memory for determining whether the occupant on the seat is an adult or a child based on the above total load. When the occupant is a child, the above total load is less than the predetermined load value. On the other hand, when the occupant is an adult, the above total load is equal to or greater than the predetermined load value. At step S7, the CPU 61 determines whether the total load calculated at step S5 is greater or less than the predetermined load value. When the total load calculated at step S5 is less than the predetermined load value, the operation proceeds to step S8. In this case, the airbag is not appropriate to be deployed (first state). Thus, the CPU 61 sends the output signal for not deploying the airbag to the airbag ECU 13 through the communication circuit 63. At step S7, when the total load is equal to or greater than the predetermined load value, the operation proceeds to step S9. In this case, the airbag is appropriate to be deployed (second state). Thus, the CPU 61 sends the output signal for allowing to deploy the airbag to the airbag ECU 13 through the communication circuit 63.

By means of a manual of the vehicle to which the embodiment of the present invention is mounted, an instruction indicated inside of the vehicle and the like, it is desirably encouraged for a person to tighten the seat belt until the lamp 12a of the indicator 12 is turned on when the person fixes the child seat to the seat. In case that the seat belt 7 is tightened with an appropriate tension (predetermined tension or more) by the person following the above manual or the instruction, the determination of the CPU 61 at step S2 becomes more accurate. According to the occupant determining device for the vehicle seat of the present embodiment of the invention, a person can check if the tightening tension of the seat belt 7 is appropriate by lightening of the lamp 12a of the indicator 12. Thus, the case in which a person fixes the child seat to the seat with less than the predetermined load value can be prevented and then fixing of the child seat can be ensured. Accordingly, the airbag on the passenger side to which the child seat is fixed can be prevented from being deployed in the event of a vehicle collision. In addition, the safety of the occupant can be improved in the event of the vehicle collision.

According to the embodiment of the present invention, the occupant determining device for the vehicle seat provided on the passenger seat side has been explained as stated above for controlling the operation of the airbag. However, the present invention can be supplied on any seats in the vehicle besides the passenger seat if it is necessary for the seats to determine whether or not the child is seated or the child seat is fixed to the seat. The present invention can be available and effective for other safety devices besides the airbag.

According to the above-mentioned embodiment of the present invention, the belt tension switch 12 is employed as the tension detecting means. However, the element for detecting deformation such as the strain gauge can be provided on the seat belt instead. In this case, the CPU 61 compares the tension calculated based on the output signal of the element for detecting deformation with the first threshold value which the CPU 61 has stored therein. Then, when the tension is equal to or greater than the first threshold value, the operation proceeds to step S3. When the tension is less than the first threshold value, the operation proceeds to step S4. In the embodiment of the present invention, the lamp 12a is employed for the indicator 12 as a means of acknowledging a person whether the tightening torsion of the seat belt 7 is appropriate. However, such as a speaker can be employed for informing the person by sound. In addition, other means can be used in the present invention. The indicator 12 is not limited to be installed in a position shown in the embodiment of the present invention and can be installed in any positions as long as the occupant can easily see (at a dash panel, instrumental, center console, and the like).

According to the structure of the present invention, a person fixing the child seat to the seat can confirm by himself/herself whether the seat belt is sufficiently fastened and is encouraged to fasten the seat belt with the predetermined tension or more. Thus, the accuracy of determination whether the child seat is fixed to the seat can be improved according to the occupant determining device for the vehicle seat of the present invention. By more accurately determining whether the child seat is fixed to the seat, the operation of the airbag can be precisely prevented when required (in case that the child seat is fixed to the seat).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. An occupant determining device for a vehicle seat, comprising:
   a tension detecting means for detecting a tension of a seat belt;
   a load detecting means for detecting a load applied to the vehicle seat;
   a determining means for determining an occupant on the vehicle seat and a tightened state of the seat belt based on either one or both of a detected result of the tension detecting means and the load detecting means; and
   a display means for displaying a determination result of the tightened state of the seat belt.

2. An occupant determining device for a vehicle seat according to claim 1, wherein:
   when a detected value of the tension detecting means is equal to or greater than a first threshold value, the determining means determines that the occupant on the vehicle seat is in a first state and the seat belt is in a first tightened state.

3. An occupant determining device for a vehicle seat according to claim 2, wherein:
   when the detected value of the tension detecting means is less than the first threshold value, the determining means determines that the seat belt is in a second tightened state.

4. An occupant determining device for a vehicle seat according to claim 3, wherein:
   when the determining means determines that the seat belt is in the second tightened state and a detected value of the load detecting means is equal to or greater than a second threshold value, the determining means determines that the occupant on the vehicle seat is in a second state.

5. An occupant determining device for a vehicle seat according to claim 4, wherein:
   When the determining means determines that the seat belt is in the second tightened state and the detected value of the load detecting means is less than the second threshold value, the determining means determines that the occupant on the vehicle seat is in the first state.

6. An occupant determining device for a vehicle seat according to claim 2, wherein:
   the first state includes the state that a child, a child restraint system or no occupant is on the vehicle seat.

7. An occupant determining device for a vehicle seat according to claim 5, wherein:
   the first state includes the state that a child, a child restraint system or no occupant is on the vehicle seat.

8. An occupant determining device for a vehicle seat according to claim 4, wherein:
   the second state includes the state that an adult is on the vehicle seat.

9. An occupant determining device for a vehicle seat, comprising:

a tension detecting means for detecting a tension of a seat belt;

a determining means for determining a tightened state of the seat belt based on a detected result of the tension detecting means; and a display means for displaying a determination result of the tightened state of the seat belt.

10. An occupant determining device for a vehicle seat according to claim 1, wherein:

the tension detecting means includes a belt tension switch provided close to a portion where the seat belt is fixed to a vehicle floor.

11. An occupant determining device for a vehicle seat according to claim 10, wherein:

the load detecting means includes a load sensor provided at the vehicle seat.

12. An occupant determining device for a vehicle seat according to claim 11, wherein:

the determining means includes a CPU provided in a controller which is provided on an undersurface of a seat cushion.

13. An occupant determining device for a vehicle seat according to claim 12, wherein:

the display means includes an indicator provided at an upper end of a belt anchor to which the seat belt is connected.

14. An occupant determining device for a vehicle seat according to claim 12, wherein:

the load detected means includes two pairs of sensors provided at front left and front right portions of the seat cushion for detecting a load applied to a front portion of the seat cushion, and rear left and rear right portions of the seat cushion for detecting a load applied to a rear portion of the seat cushion.

15. An occupant determining device for a vehicle seat according to claim 14, wherein:

the CPU calculates a total load applied to the seat cushion by adding loads applied to the front portion and the rear portion of the seat cushion and detected by load sensors respectively.

16. An occupant determining device for a vehicle seat according to claim 15, wherein:

the CPU compares the total load with a threshold value and determines whether the total load is equal to or greater than the threshold value.

17. An occupant determining device for a vehicle according to claim 6, wherein:

the first state further includes the state that an airbag is not deployed.

18. An occupant determining device for a vehicle according to claim 7, wherein:

the first state further includes the state that an airbag is not deployed.

* * * * *

UNITED STATES PATENT AND TRADEMARK OFFICE
CERTIFICATE OF CORRECTION

PATENT NO. : 6,594,571 B2　　　　　　　　　　　　　　　　　　　　Page 1 of 1
DATED : July 15, 2003
INVENTOR(S) : Morio Sakai et al.

It is certified that error appears in the above-identified patent and that said Letters Patent is hereby corrected as shown below:

<u>Title page,</u>
Add Item:
-- [30]　　　Foreign Application Priority Data

Sep. 25, 2001 (JP) .............................. 2001-292473 --

Signed and Sealed this

Twentieth Day of January, 2004

JON W. DUDAS
*Acting Director of the United States Patent and Trademark Office*